United States Patent [19]

Blonder

[11] Patent Number: 5,620,371
[45] Date of Patent: Apr. 15, 1997

[54] COMPUTER TRACKBALL

[75] Inventor: Greg E. Blonder, Summit, N.J.

[73] Assignee: Lucent Technologies Inc., Murray Hill, N.J.

[21] Appl. No.: 555,197

[22] Filed: Nov. 8, 1995

[51] Int. Cl.⁶ .................................................. G09G 5/00
[52] U.S. Cl. .......................... 463/37; 345/167; 345/168
[58] Field of Search ........................... 273/148 B, 58 R, 273/58 F, 58 H; 463/36, 37, 38; 345/167, 163, 168, 156, 157

[56] References Cited

U.S. PATENT DOCUMENTS

| | | | |
|---|---|---|---|
| 2,351,762 | 6/1944 | Hoover | 446/396 |
| 3,655,197 | 4/1972 | Milbaum | 273/58 F X |
| 4,404,865 | 9/1983 | Kim | 463/38 X |
| 5,078,019 | 1/1992 | Aoki | 345/167 X |
| 5,288,993 | 2/1994 | Bidiville et al. | 345/163 X |
| 5,381,159 | 1/1995 | Oohori | 345/163 |

Primary Examiner—Raleigh W. Chiu
Attorney, Agent, or Firm—Ronald D. Slusky

[57] ABSTRACT

A computer trackball comprises a transparent outer sphere inside of which is disposed a second inner sphere. The outer diameter of the inner sphere is a little bit smaller than the inner diameter of the outer sphere. Disposed on the outer surface of the inner sphere, at one "end" thereof is a logo or other graphical image. The inner sphere tends to maintain itself in a predetermined orientation—e.g., with the graphical image pointing directly "up" relative to the keyboard or other housing fin which the trackball is held—notwithstanding rotation of the outer sphere by a user in the course of operating the trackball.

18 Claims, 2 Drawing Sheets

COMPUTER TRACKBALL

BACKGROUND OF THE INVENTION

The invention relates to trackballs used in laptop and other computers to, for example, control the movement of a cursor displayed on the computer screen. Indeed, the prior art to my invention comprises the conventional trackball and any of plurality of different known mechanical, optical and/or electrical arrangements for enabling the computer to track rotations of the ball in response to user manipulation of same and to translate the direction and extent of rotation into electrical signals that can be used to, for example, change the displayed position of the cursor.

SUMMARY OF THE INVENTION

In the prior art, the trackball is typically made of an opaque material and is either an empty hollow shell or a solid, homogeneous sphere. In accordance with the invention, the trackball is neither of these but, rather, comprises a translucent—preferably transparent—hollow outer sphere inside of which is disposed a second inner sphere. The outer diameter of the inner sphere is a little bit smaller than the inner diameter of the outer sphere so that the former is free to rotate within the latter. Disposed on the outer surface of the inner sphere, at one "end" thereof, is, in preferred embodiments, a graphical image—such as a company logo—and the construction of the inner sphere and the way that it is encapsulated within the outer sphere are such as to cause the inner sphere to tend to maintain a predetermined orientation—e.g., with the graphical image pointing directly "up" relative to the keyboard or other housing in which the trackball is held—notwithstanding rotation of the outer sphere by a user in the course of operating the trackball. This functionality is illustratively accomplished by having the inner sphere weighted in the inside at an "end" that is directly opposite to the center of the graphical image and by having the void between the inner surface of the outer sphere and the outer surface of the inner sphere filled with a fluid.

The overall visual effect—wherein the graphical image remains "on top" notwithstanding rotation of the outer sphere in the process of trackball operation—is one which tends to fascinate the typical person and thus can serve as a selling feature of the computer, particularly vis-a-vis consumers who like to have "something different." At the same time, the invention provides the computer manufacturer with the opportunity to display its brand and/or logo in an eye-catching place on the computer.

The physical construction of the trackball used in my invention could be substantially identical to that of known a known type of small-ball-like novelty item (available, for example, in science museums and from Oriental Trading Company, PO Box 3407, Omaha, Nebr. 68103 as item number 12/521) in which the graphical image is, for example, that of an eyeball which continues to "look up" as the ball is rolled across a table, for example. It has remained for me, however, to appreciate that such an item could be used to advantage as a computer trackball.

DETAILED DESCRIPTION

Figure 1:
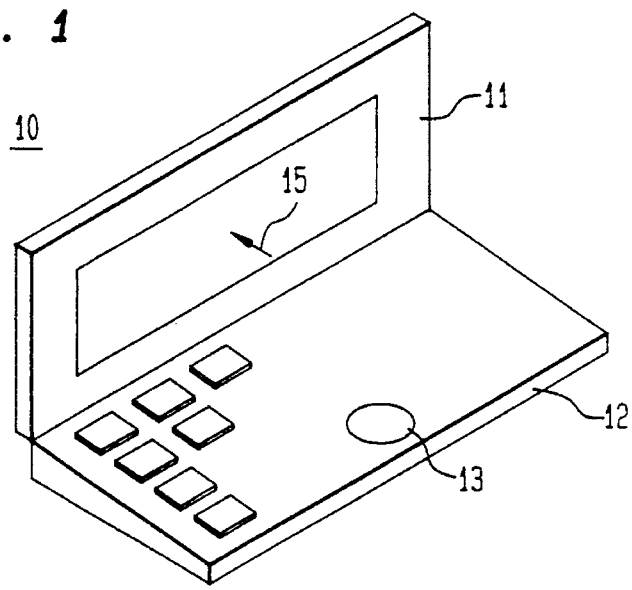
FIG. 1 shows a laptop computer which includes a trackball embodying the principles of my invention.
Figure 2:
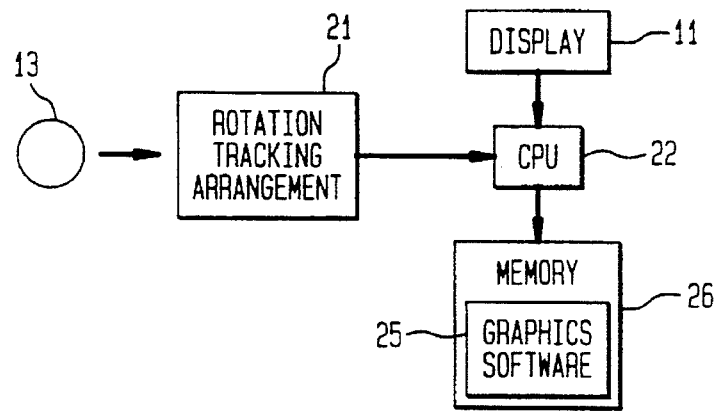
FIG. 2 shows the functional relationship among the trackball, an arrangement within the computer for tracking rotations of the trackball; and the computer CPU.

Laptop computer 10 in FIG. 1 includes a display 11 and keyboard 12. Mounted within keyboard 12 is a trackball 13 which is held fixedly within keyboard 12 but is freely rotatable. As shown schematically in FIG. 2, computer 10 includes any of plurality of different known mechanical, optical and/or electrical arrangements 21 which respond to rotations of the trackball by generating a electrical signal indicative of direction and extent of rotation of the trackball. Those signals are ultimately applied to the CPU 22 of the computer. Graphics software 25 stored in memory 26 and executed by CPU 22 causes the image of a cursor 15 (FIG. 1) to be moved from one location on the display to another as in response to those electrical signals, i.e., as a function of the trackball rotation.

Figure 3:
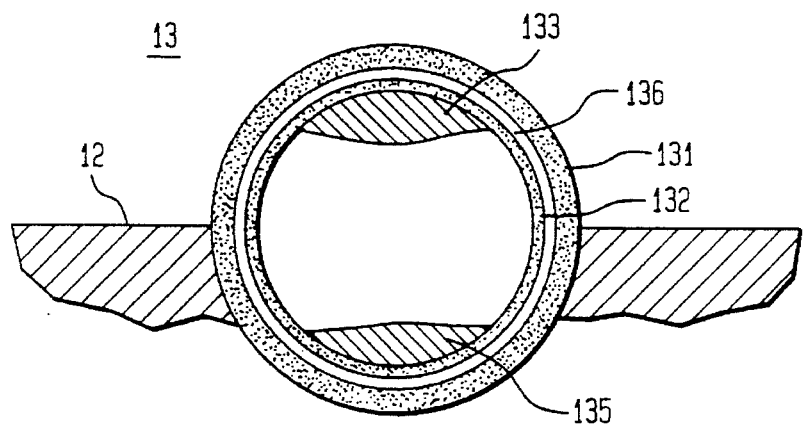
FIG. 3 is an cross-sectional view of one illustrative embodiment of the trackball.

As seen in FIG. 3, trackball 13 is comprised of a translucent—and preferably transparent—outer sphere 131, inside of which is disposed a second inner sphere 132. Both the outer sphere and inner sphere are illustratively made of plastic. The outer diameter of the inner sphere 132 is a little bit smaller than the inner diameter of outer sphere 131. Printed or otherwise placed on the outer surface of the inner sphere, at one "end" thereof is a graphical image 133—illustratively the logo of the computer manufacturer—and the construction of the inner sphere and the way that it is encapsulated within the outer sphere are such as to cause the inner sphere to tend to maintain a predetermined orientation—e.g., with graphical image 133 pointing directly "up" relative to keyboard 12—notwithstanding rotation outer sphere 131 by a user in the course of operating the trackball. That is, inner sphere 132 is prevented from rotating freely in two dimensions, i.e., from "top to bottom." In preferred embodiments, this functionality is accomplished by having inner sphere 132 weighted by a weight 135 that is attached to the inside of the inner sphere at an "end" that is directly opposite to the center of the graphical image and having the void between the inner surface of the outer sphere and the outer surface of the inner sphere filled with a body of fluid 136 which causes the inner sphere to float within the outer sphere.

As outer sphere 131 is rotated, inner sphere 132 may also rotate to a small extent, depending on the speed of rotation of the outer sphere. However, once the user ceases to rotate outer sphere 131, graphical image 133 will return to its original "up" position. And since outer sphere 13 1 is transparent, graphical image 133 will always be viewable by the user no matter how the outer sphere is rotated.

The foregoing merely illustrates the principles of the invention. It will thus be appreciated, for example, that any known means for tracking the movement of the trackball can be used in the practicing the invention although preferred embodiments will not use trackball movement tracking arrangements which require the use of markings on the outside of the trackball since this will detract somewhat from the overall visual effect. Moreover, any means that will tend to keep the inner sphere in a particular orientation can be used. Thus, for example, rather than being a hollow sphere with a weight attached to its inner surface, the inner element of the trackball could be a solid sphere which is made more dense at one "end" than the other, the more dense material at that end thereby serving as the weight.

Figure 4:
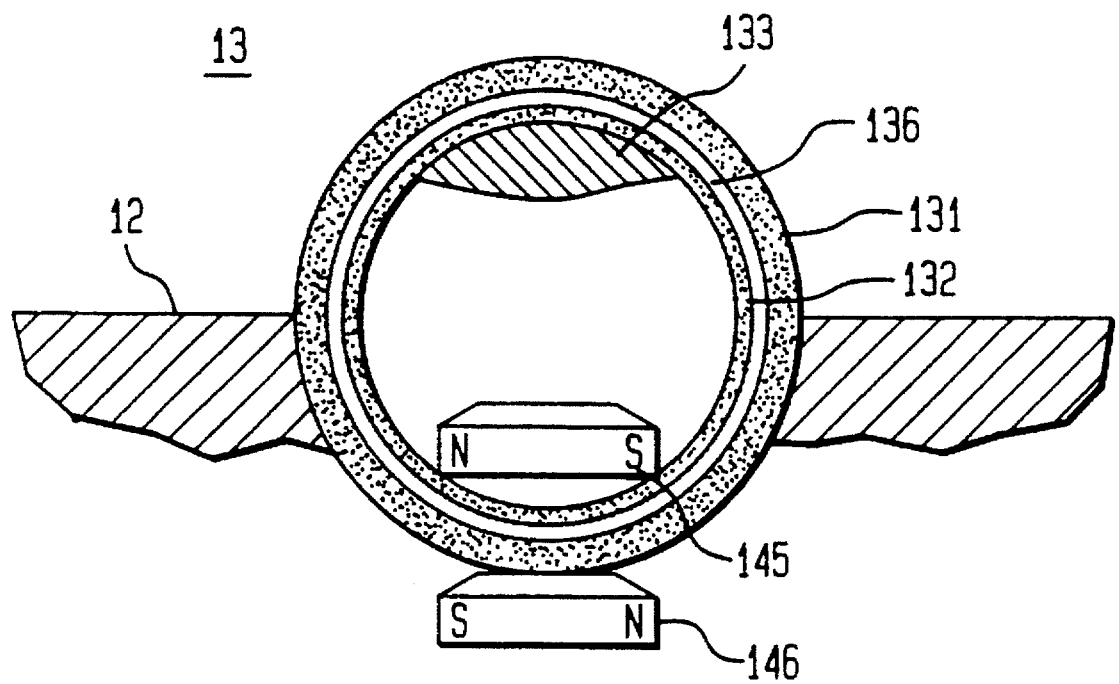
FIG. 4 is an cross-sectional view of another illustrative embodiment of the trackball.

As another possibility, inner sphere 132 might contain, in addition to, or in place of, weight 135 a bar magnet. In FIG. 4, for example, the weight within inner sphere 132 is bar magnet 145 which, because it is a magnet, tends to keep image 133 oriented toward magnetic north, in which case image 133 might be a compass rose image and the trackball then serves as a compass.

As another alternative, inner sphere may, again, contain bar magnet 145 but, in addition, a second magnet 146 is disposed within the keyboard or other housing that holds the trackball in such a way that the two magnets attract. Thus, in addition to inner sphere 132 not rotating "top to bottom," as already described, the attraction between magnetic weight 135 and additional magnet 146 will keep inner sphere 132 from rotating around its vertical axis. Thus image 133 will kept in a particular orientation relative to the front of the keyboard, which would be desirable, for example, to keep a face or other image in a particular orientation relative to the user.

Moreover, instead of, or in addition to, having a graphical image printed, embossed or otherwise presented on the outer surface of the inner sphere, the inner sphere could be translucent or transparent at least over the portion of its surface the remains oriented toward the user and could have fixedly embedded therein some sort of three-dimensional object which will then be visible to the user and would maintain a particular orientation vis-a-vis the user.

In addition, the trackball need not be a physical part of a computer but, rather, could be a stand-alone peripheral—i.e., a trackball held in its own separate housing—that electrically connects to the computer.

It will thus be appreciated that those skilled in the art will be able to devise numerous arrangements which, although not explicitly shown or described herein, embody the principles of the invention and are within its spirit and scope.

I claim:

1. Apparatus comprising a housing, a freely rotatable trackball fixedly held in said housing, and means for detecting rotations of the trackball and for generating signals indicative of same, said trackball including a translucent outer sphere, and an inner sphere disposed inside of the outer sphere, the trackball being such that the inner sphere maintains a predetermined orientation relative to said housing notwithstanding rotations of the outer sphere.

2. The invention of claim 1 further comprising a graphical image disposed on at least a portion of the outer surface of the inner sphere.

3. The invention of claim 2 wherein the graphical image is a compass rose.

4. The invention of claim 2 wherein said graphical image is a company logo.

5. The invention of claim 1 further comprising a body of fluid disposed between the inner surface of the outer sphere and the outer surface of the inner sphere.

6. The invention of claim 5 wherein the trackball includes a weight disposed in the interior of said inner sphere at a point that is substantially opposite to said portion.

7. The invention of claim 6 further comprising a first magnet disposed within said housing, and wherein the trackball further includes a second magnet which is attracted to said first magnet.

8. The invention of claim 5 wherein the trackball further includes a magnet which causes the inner sphere to maintain a predetermined orientation relative to magnetic north.

9. The invention of claim 1 wherein said housing is a computer keyboard housing.

10. Apparatus comprising a computer including a housing a freely rotatable trackball fixedly held in said housing, and means for detecting rotations of the trackball and for generating signals indicative of same, said trackball including a translucent outer sphere, and an inner sphere disposed inside of the outer sphere, the trackball being such that the inner sphere maintains a predetermined orientation relative to said housing notwithstanding rotations of the outer sphere.

11. The invention of claim 10 further comprising a graphical image disposed on at least a portion of the outer surface of the inner sphere.

12. The invention of claim 11 wherein said computer further includes a display and means for controlling the position of a cursor, presented on the display, as a function of rotation of the outer sphere.

13. The invention of claim 12 wherein said housing is a computer keyboard housing.

14. The invention of claim 11 further comprising a body of fluid disposed between the inner surface of the outer sphere and the outer surface of the inner sphere.

15. The invention of claim 11 wherein the trackball includes a weight disposed in the interior of said inner sphere at a point that is substantially opposite to said portion.

16. The invention of claim 11 wherein the trackball further includes a magnet which causes the inner sphere to maintain a predetermined orientation relative to magnetic north.

17. The invention of claim 11 further comprising a first magnet disposed within said housing, and wherein the trackball further includes a second magnet which is attracted to said first magnet.

18. The invention of claim 11 wherein said graphical image is a company logo.

\* \* \* \* \*